(12) United States Patent
Liu et al.

(10) Patent No.: US 11,783,959 B2
(45) Date of Patent: Oct. 10, 2023

(54) ELECTRONIC PASTE COMPOSITION, PREPARATION METHOD THEREFOR AND USE THEREOF

(71) Applicant: CHINA TOBACCO HUBEI INDUSTRIAL CORPORATION LIMITED, Wuhan (CN)

(72) Inventors: Huachen Liu, Wuhan (CN); Dan Li, Wuhan (CN); Yikun Chen, Wuhan (CN); Tengfei Deng, Wuhan (CN); Bing Liu, Wuhan (CN)

(73) Assignee: CHINA TOBACCO HUBEI INDUSTRIAL CORPORATION LIMITED, Wuhan (CN)

( * ) Notice: Subject to any disclaimer, the term of this patent is extended or adjusted under 35 U.S.C. 154(b) by 343 days.

(21) Appl. No.: 17/261,890

(22) PCT Filed: Jul. 23, 2018

(86) PCT No.: PCT/CN2018/096667
§ 371 (c)(1),
(2) Date: Jul. 22, 2021

(87) PCT Pub. No.: WO2020/019119
PCT Pub. Date: Jan. 30, 2020

(65) Prior Publication Data
US 2021/0407701 A1   Dec. 30, 2021

(51) Int. Cl.
*H01B 1/22* (2006.01)
*B22F 1/05* (2022.01)
*B22F 1/102* (2022.01)

(52) U.S. Cl.
CPC ............ *H01B 1/22* (2013.01); *B22F 1/05* (2022.01); *B22F 1/102* (2022.01); *B22F 2301/20* (2013.01)

(58) Field of Classification Search
None
See application file for complete search history.

(56) References Cited

U.S. PATENT DOCUMENTS

| | | | |
|---|---|---|---|
| 1,559,867 A | 11/1925 | Griggs | |
| 1,663,922 A | 3/1928 | Robin et al. | |
| 4,493,789 A * | 1/1985 | Ueyama | C22C 32/0031 524/439 |
| 2012/0164777 A1* | 6/2012 | Kleine Jaeger | H01L 31/022425 977/773 |
| 2018/0346371 A1* | 12/2018 | Moyer | H01B 1/22 |

FOREIGN PATENT DOCUMENTS

| | | | | |
|---|---|---|---|---|
| CN | 102666549 A | | 9/2012 | |
| CN | 105472791 A | | 4/2016 | |
| CN | 106747420 A | | 5/2017 | |
| CN | 107452436 A | | 12/2017 | |
| JP | 6148493 | * | 3/1986 | |
| JP | 10326521 A | | 12/1998 | |
| WO | WO-2017100516 A1 | * | 6/2017 | ........... C01B 19/004 |
| WO | 2020019119 A1 | | 1/2020 | |
| WO | 2020253519 A1 | | 12/2020 | |

OTHER PUBLICATIONS

Search Report for International Patent Application PCT/CN2018/096667, dated Jan. 30, 2020.

* cited by examiner

*Primary Examiner* — Tanisha Diggs
(74) *Attorney, Agent, or Firm* — FRESH IP PLC; Clifford D. Hyra; Aubrey Y. Chen

(57) ABSTRACT

The present disclosure provides an electronic paste composition and a preparation method thereof. The electronic paste composition includes tungsten, manganese, an additive, and an organic vehicle, wherein the additive is selected from at least one of ruthenium, tellurium, germanium, and vanadium. The preparation method includes: mixing tungsten powder and manganese powder with the additive, and then bringing a mixture as acquired into contact with the organic vehicle. In addition, the present disclosure further provides a use of the electronic paste composition in preparing a ceramal heat generation body having a low temperature coefficient of resistance. Each of the electronic paste composition according to the present disclosure and the electronic paste prepared by the method according to the present disclosure has a consistent and low temperature coefficient of resistance.

10 Claims, No Drawings

ELECTRONIC PASTE COMPOSITION, PREPARATION METHOD THEREFOR AND USE THEREOF

TECHNICAL FIELD

The present disclosure relates to the field of electronic paste, and in particular to an electronic paste composition, and a preparation method and use of the same.

BACKGROUND

Since the 1960s, more than 20 companies in the United States, which includes ESL, Englehard, Cermalley, Ferro, EMCA, Heraeus, IBM, Lechs, and General Electric, have successively developed, manufactured, and sold various electronic pastes. For the European companies that produce and sell paste and raw materials, Degussa and Philips are the well-known ones. After the 1980s, Japan has gradually developed into a major paste producer in the world, and the well-known paste companies include Sumitomo Metal Mining, Shoei Chemical, Tanaka Precious Metals, Murata Manufacturing, Taiyo Yuden, Hitachi Chemical, Toshiba Chemical, Fukuda Metal Powder, Mitsubishi Metals, NEC, TDK, etc. The involvement in electronic pastes is relatively late in China and mainly in the late 1980s, represented by Kunming Precious Metals and 4310 Factory. The application of the electronic paste in China is mainly conductive paste (silver paste, aluminum silver paste), and the application of other pastes are insufficient due to the pursuit of a low cost.

As a novel material, the electronic paste is far superior to traditional circuit equipment (such as resistance wire, electric heating tube, etc.). In addition, the electronic paste is characterized in environmental protection, high efficiency and energy saving with a close cost to the traditional materials, and will be a main application direction in the future undoubtedly. At present, the domestic demand for a new high-performance electronic paste is increasing in China. Although the prior art discloses a variety of electronic paste products, the electronic element prepared by the electronic pastes of the prior art have different batches, which leads to an extremely large deviation in the temperature coefficient of resistance (TCR) and thereby causes a great difficulty in controlling the resistance. Consequently, the defective rate of the product may be extremely high, the error of TCR of the product may be very large, and the circuit program may fail to control the temperature accurately. In addition, in terms of the existing electronic paste products, it is difficult to achieve a low TCR while ensuring that the TCR has a satisfactory error.

SUMMARY

An object of the present disclosure is to overcome the aforesaid defects in the existing products prepared by the electronic pastes, which has a great difficulty to achieve a low TCR while ensuring that the TCR of different batches has a low error. After a lot of experiments, the inventor of the present patent has surprisingly found that each batch of the products prepared by the electronic paste composed of certain components has an incredibly consistent TCR and the TCR is satisfactorily low, so that the inventor obtains the present disclosure.

The present disclosure provides an electronic paste composition capable of achieving a consistent and low TCR, a method for preparing the electronic paste, and a use of the electronic paste.

In order to achieve the object, in one aspect, the present disclosure provides an electronic paste composition, comprising: tungsten, manganese, an additive and an organic vehicle, wherein the additive is selected from at least one of ruthenium, tellurium, germanium and vanadium.

In a preferred embodiment of the present disclosure, a weight ratio of the tungsten and manganese is 7:3 to 9.5:0.5.

In a preferred embodiment of the present disclosure, a content of the additive is 0.5-5 wt % based on a total weight of the tungsten and manganese, and preferably, the content of the additive is 1-5 wt %.

In a preferred embodiment of the present disclosure, the organic vehicle is a mixture of terpineol, ethyl cellulose and absolute ethanol, and preferably, a content of the organic vehicle is 5-20 wt % based on the total weight of the tungsten and manganese.

In another aspect, the present disclosure provides a method for preparing the electronic paste composition according to the present disclosure, comprising: mixing tungsten powder and manganese powder with an additive, and then bringing a mixture as acquired into contact with an organic vehicle.

In a preferred embodiment of the present disclosure, the contact is performed in a ball mill.

In a preferred embodiment of the present disclosure, the ball mill is run at a speed of 100-800 r/min for 0.5-5 h.

In a preferred embodiment of the present disclosure, the ball mill uses absolute ethanol as a ball milling medium, and preferably, a weight ratio of the mixture to the ball milling medium is 1:1 to 1:3.

In a preferred embodiment of the present disclosure, the electronic paste composition as acquired has a particle size of 200-500 meshes and a viscosity of 10-80 Pa·s.

In yet another aspect, the present disclosure further provides a use of the electronic paste composition according to the present disclosure and the electronic paste composition prepared by the method according to the present disclosure in preparing a ceramal heat generation body having a low temperature coefficient of resistance.

In summary, the electronic paste composition of the present disclosure possesses unexpected characteristics, and the products, such as heat generation elements, prepared by the electronic paste of the present disclosure have a surprisingly consistent and low TCR for different batches, which makes it rather easy for resistance control and results in an extremely low defective rate of the products. When the electronic paste of the present disclosure is applied to the ceramal heat generation body, an excellent performance in the unexpectedly consistent and low TCR can be obtained, which ensures that the TCR of the product in respective batches is consistent, and the resistance changes little by temperature in the process of use, thereby allowing a simple circuit and a high overall heat generation reliability.

Other features and advantages of the present disclosure will be described in detail in the following specific embodiments.

DETAILED DESCRIPTION

The specific embodiments of the present disclosure will be further illustrated in detail hereinafter. It should be understood that the specific embodiments described herein merely illustrate and explain the present disclosure, and does not limit the present disclosure.

The endpoints and any values of the ranges disclosed herein are not limited to the precise range or value, and these ranges or values should be understood to include the values close to these ranges or values. In terms of the numerical ranges, one or more new numerical ranges may be acquired by combining endpoint values of each range, or by combining the endpoint value of each range and an individual point value, or by combining the individual point values, and these numerical ranges should be considered as specifically disclosed herein.

As used herein, the term "electronic paste" is a basic material for preparing the ceramal heat generation body and belongs to a paste formed by mixing solid powder and liquid solvent uniformly through three-roll rolling processes. Depending on the difference in use, the electronic paste may be divided into dielectric paste, resistance paste and conductor paste; depending on the difference in substrate type, the electronic paste may be divided into ceramic substrate electronic paste, polymer substrate electronic paste, glass substrate electronic paste, metal insulation substrate electronic paste and the like; depending on the difference in sintering temperature, the electronic paste may be divided into high-temperature drying electronic paste, medium-temperature drying electronic paste and low-temperature drying electronic paste; depending on the difference in use, the electronic paste may be further divided into general electronic paste and special electronic paste; and depending on the difference in price of the conductive phase, the electronic paste may be divided into precious metal electronic paste and base metal electronic paste.

As used herein, the term "temperature coefficient of resistance (TCR)" refers to relative changes in the resistance value when the temperature of the resistance changes by 1 degree (that is, the change rate of the resistance value relative to the resistance). The calculation formula thereof is TCR=$(R_{T2}-R_{T1})/[T_2-T_1) \times R_{T1}]$, and the unit is ppm/° C., where $T_1$ refers to a first temperature, $T_2$ refers to a second temperature, $R_{T1}$ refers to a resistance value at the first temperature, and $R_{T2}$ refers to a resistance value at the second temperature. The TCR is a parameter closely related to the microstructure of the metal, and has a theoretical maximum value under the absence of any defects. That is, the magnitude of the TCR per se characterizes the performance of the metal process to some extent. During the research and development process or the online monitoring of the new technology, the TCR may be adopted to conduct the early monitoring and make rapid evaluation of the reliability of metals.

In one aspect, the present disclosure provides an electronic paste composition, including: tungsten, manganese, an additive and an organic vehicle, wherein the additive is selected from at least one of ruthenium, tellurium, germanium and vanadium.

The tungsten-manganese paste belongs to common electronic paste in the art. As a main heat generation element, the tungsten, however, has a rather high TCR, which may cause a high TCR for the entire electronic paste. According to the present disclosure, the contents of the tungsten and manganese in the electronic paste composition of the present disclosure are not particularly limited, and may be the common contents in the art. In a preferred embodiment of the present disclosure, a weight ratio of the tungsten and manganese may be 7:3 to 9.5:0.5, and preferably, the weight ratio of the tungsten and manganese may be 8:2 to 9.3:0.7 (such as 8.5:1.5).

In addition, the inventor has found after research that adding the additive of the present disclosure (such as at least one of ruthenium, tellurium, germanium and vanadium) to the conventional tungsten-manganese paste in the art is advantageous to greatly reduce the TCR of the electronic paste. In a preferred embodiment of the present disclosure, a content of the additive may be 0.5-5 wt % based on a total weight of the tungsten and manganese, and more preferably, the content of the additive may be 1-4 wt % (such as 1.5 wt %, 2 wt % or 2.5 wt %).

According to the present disclosure, the type and content of the organic vehicle in the electronic paste composition of the present disclosure are not particularly limited, and may be the common type and content in the art. In a preferred embodiment, the organic vehicle may be a mixture of terpineol, ethyl cellulose and absolute ethanol, such as, 90-95 wt % (e.g., 94 wt %) of terpineol, 3-5 wt % (e.g., 5 wt %) of ethyl cellulose, and 1-3 wt % (e.g., 1 wt %) of absolute ethanol, and preferably, the content of the organic vehicle may be 5-20 wt % based on the total weight of the tungsten and manganese.

In another aspect, the present disclosure provides a method for preparing the electronic paste composition according to the present disclosure, including: mixing tungsten powder and manganese powder with an additive, and then bringing a mixture as acquired into contact with an organic vehicle.

According to the present disclosure, mixing the tungsten powder and manganese powder with the additive may be performed in any order. For example, the tungsten powder and the manganese powder may be mixed firstly before mixing with the additive, or the three may be mixed simultaneously. When the mixture as acquired is brought into contact with the organic vehicle, the contact between the mixture and the organic vehicle may be performed under stirring or under a ball milling condition, so as to make the mixture more uniform. In a preferred embodiment of the present disclosure, the contact may be performed in a planetary ball mill.

According to the present disclosure, the ball milling condition is not particularly limited, and may be conventional ball milling conditions in the art as long as the mixture can be fully contacted with the organic vehicle. In a preferred embodiment of the present disclosure, the ball mill may be run at a speed of 100-800 r/min for 0.5-5 h. In another preferred embodiment of the present disclosure, the ball mill may be run at a speed of 400-500 r/min for 1.5-3 h. In addition, the ball milling medium used in the ball mill may be conventional ball milling medium in the art. In a preferred embodiment of the present disclosure, the ball mill may use absolute ethanol as the ball milling medium, and preferably, a weight ratio of the mixture to the ball milling medium may be 1:1 to 1:3 (such as 1:1.5).

In the method for preparing the electronic paste composition of the present disclosure, the electronic paste composition may be prepared to have desired physical properties according to needs. In order to enhance usage performance of the electronic paste in coating and printing, the electronic paste composition may be configured with a particle size of 200-500 meshes and a viscosity of 10-80 Pa·s after the mixture is brought into contact with the organic vehicle by the ball mill.

In yet another aspect, the present disclosure further provides a use of the electronic paste composition according to the present disclosure and the electronic paste composition prepared by the method according to the present disclosure in preparing a ceramal heat generation body having a low temperature coefficient of resistance.

The present disclosure will be described in detail below through Examples.

In following Examples and Comparison examples, an organic vehicle is prepared by a mixture of 94 wt % of terpineol, 5 wt % of ethyl cellulose and 1 wt % of absolute ethanol, and the preparation is implemented by weighing the terpineol, ethyl cellulose and absolute ethanol in proportions and then mixing uniformly with a magnetic stirrer at a water bath temperature of 90° C. In addition, some basic parameters and manufacturers of respective raw materials are as shown in Table 1.

TABLE 1

| Name | Purity (%) | Particle size (μm) | Manufacturer |
|---|---|---|---|
| Tungsten powder | 99.90 | 4.00-10.00 | Shanghai Macleans Biochemical Technology Co., Ltd. |
| Manganese powder | 99.90 | 4.00-10.00 | Shanghai Macleans Biochemical Technology Co., Ltd. |
| Iron powder | 99.00 | 100.00 | Shanghai Macleans Biochemical Technology Co., Ltd. |
| Molybdenum powder | 99.50 | 20.00 | Shanghai Macleans Biochemical Technology Co., Ltd. |
| Ruthenium Power | 99.95 | 150 | Shenyang Jiabei Trading Company |
| Terpineol | AR | — | Sinopharm Chemical Reagent Co., Ltd. |
| Ethyl cellulose | AR | — | Sinopharm Chemical Reagent Co., Ltd. |
| Absolute ethanol | AR | — | Sinopharm Chemical Reagent Co., Ltd. |

Example 1

Firstly, 90 parts by weight of tungsten powder and 10 parts by weight of manganese powder are taken and mixed uniformly. Afterwards, the mixed powder is mixed with 10 parts by weight of organic vehicle and then put together into a planetary ball mill for a ball milling, wherein the absolute ethanol serves as a ball milling medium, and the weight ratio of the mixture to the ball milling medium is 1.5:1. In addition, the ball mill is run at a speed of 500 r/min for 1.5 h to prepare the electronic paste composition B0.

Example 2

The electronic paste composition B1 is prepared in the same manner as Example 1, except that 0.9 parts by weight of ruthenium powder is added as an additive.

Example 3

The electronic paste composition B2 is prepared in the same manner as Example 1, except that 1.8 parts by weight of ruthenium powder is added as an additive.

Example 4

The electronic paste composition B3 is prepared in the same manner as Example 1, except that 2.7 parts by weight of ruthenium powder is added as an additive.

Comparison Example 1

Firstly, 90 parts by weight of tungsten powder and 10 parts by weight of manganese powder are taken and mixed uniformly. Afterwards, the mixed powder is mixed with 10 parts by weight of organic vehicle and then put together into a planetary ball mill for a ball milling, wherein the absolute ethanol serves as a ball milling medium, and the weight ratio of the mixture to the ball milling medium is 1.5:1. In addition, the ball mill is run at a speed of 300 r/min for 3 h to prepare the electronic paste composition A0.

Comparison Example 2

The electronic paste composition A1 is prepared in the same manner as Comparison example 1, except that 0.9 parts by weight of iron powder is added as an additive.

Comparison Example 3

The electronic paste composition A2 is prepared in the same manner as Comparison example 1, except that 2.7 parts by weight of iron powder is added as an additive.

Comparison Example 4

The electronic paste composition A3 is prepared in the same manner as Comparison example 1, except that 4.5 parts by weight of iron powder is added as an additive.

Comparison Example 5

The electronic paste composition A4 is prepared in the same manner as Comparison example 1, except that 6.3 parts by weight of iron powder is added as an additive.

Comparison Example 6

The electronic paste composition A5 is prepared in the same manner as Comparison example 1, except that 0.9 parts by weight of molybdenum powder is added as an additive.

Comparison Example 7

The electronic paste composition A6 is prepared in the same manner as Comparison example 1, except that 2.7 parts by weight of molybdenum powder is added as an additive.

Comparison Example 8

The electronic paste composition A7 is prepared in the same manner as Comparison example 1, except that 4.5 parts by weight of molybdenum powder is added as an additive.

Comparison Example 9

The electronic paste composition A8 is prepared in the same manner as Comparison example 1, except that 6.3 parts by weight of molybdenum powder is added as an additive.

After the electronic paste compositions B0-B3 of Examples 1-5 and the electronic paste compositions A0-A8 of Comparative examples 1-9 are prepared, the electronic paste compositions are printed on a ceramic substrate by conventional techniques such as screen printing to form heat generation elements, and then, the TCR of each heat generation element is measured according to following Test examples.

In the electronic paste compositions prepared by uniformly mixing tungsten powder and manganese powder with the ball mill, as described above, similar experimental effects can also be acquired by adding any one of tellurium, germanium or vanadium.

Test Example 1

The resistance values of the heat generation elements as acquired from the electronic paste compositions B0-B3 of Examples 1~4 at temperatures of 25° C., 83° C., 150° C., and 230° C. are measured, the results are shown in Table 2. Then, the TCRs of Examples 1-4 are acquired based on the resistance values in respective examples through the least square method and the linear fitting, the results are shown in Table 3.

TABLE 2

| R/Ω | T/° C. | | | |
|---|---|---|---|---|
| | 25 | 83 | 150 | 230 |
| B0 | 6.72 | 8.98 | 10.76 | 12.99 |
| B1 | 7.38 | 9.38 | 10.78 | 12.89 |
| B2 | 8.58 | 11.02 | 11.88 | 13.99 |
| B3 | 9.22 | 10.19 | 12.18 | 14.32 |

TABLE 3

| Sample Sequence Number | B0 | B1 | B2 | B3 |
|---|---|---|---|---|
| TCR (ppm/° C.) | 4464 | 3550 | 2902 | 2765 |

Test Example 2

The resistance values of the heat generation elements as acquired from the electronic paste compositions A0-A8 of Comparative Examples 1-9 at temperatures of 25° C., 100° C., 200° C., 300° C., 400° C., and 500° C. are measured, the results are shown in Table 4. Then, the TCRs in Comparative Examples 1-9 are acquired based on the resistance values in respective examples through the least square method and the linear fitting, the results are shown in Table 5.

TABLE 4

| R/Ω | T/° C. | | | | | |
|---|---|---|---|---|---|---|
| | 25 | 100 | 200 | 300 | 400 | 500 |
| A0 | 43.98 | 51.85 | 65.70 | 81.98 | 100.78 | 121.73 |
| A1 | 34.80 | 37.91 | 47.62 | 58.79 | 71.06 | 85.53 |
| A2 | 30.86 | 36.42 | 46.27 | 57.52 | 70.66 | 80.72 |
| A3 | 37.41 | 40.74 | 50.76 | 63.35 | 76.90 | 90.30 |
| A4 | 33.53 | 38.54 | 47.71 | 59.29 | 72.78 | 87.86 |
| A5 | 37.16 | 42.84 | 54.12 | 67.39 | 82.00 | 97.60 |
| A6 | 36.27 | 39.31 | 47.56 | 57.76 | 68.91 | 78.57 |
| A7 | 40.03 | 43.34 | 54.57 | 66.59 | 80.40 | 95.94 |
| A8 | 40.73 | 46.18 | 57.74 | 70.79 | 85.77 | 102.14 |

TABLE 5

| Sample Sequence Number | A0 | A1 | A2 | A3 | A4 | A5 | A6 | A7 | A8 |
|---|---|---|---|---|---|---|---|---|---|
| TCR (ppm/° C.) | 3974 | 3411 | 3662 | 3349 | 3689 | 3697 | 2754 | 3272 | 3437 |

Example 5

Based on the content shown in Table 6, the electronic paste compositions C1-C8 are prepared in the same manner as Example 1, with each electronic paste being prepared 5 batches. Then, all batches of the electronic paste composition are printed on the ceramic substrate by screen printing or other conventional techniques in the art to form heat generation elements, and the TCR of the heat generation element acquired from the electronic paste composition of each batch is acquired in the same manner as in Test Example 1. For each of the electronic paste compositions C1-C8, the average TCR of 5 batches and the deviation rate of TCR for each batch ((TCRn-Average TCR)/Average TCR, where n is 1, 2, 3, 4 or 5) are calculated based on TCRs of the 5 batches, which are TCR1, TCR2, TCR3, TCR4 and TCR5 respectively. Furthermore, the average deviation rate of TCRs of the 5 batches (an average value of the deviation rates of TCRs of the 5 batches) is calculated, as shown in Table 7.

TABLE 6

| | | Tungsten | Manganese | Iron | Molybdenum | Ruthenium | Germanium | Vanadium | Tellurium |
|---|---|---|---|---|---|---|---|---|---|
| C1 | Tungsten Manganese | 90 | 10 | — | — | — | — | — | — |
| C2 | Tungsten Manganese Iron | 90 | 10 | 2 | — | — | — | — | — |
| C3 | Tungsten Manganese Molybdenum | 90 | 10 | — | 2 | — | — | — | — |

TABLE 6-continued

| | | Tungsten | Manganese | Iron | Molybdenum | Ruthenium | Germanium | Vanadium | Tellurium |
|---|---|---|---|---|---|---|---|---|---|
| C4 | Tungsten Ruthenium | 98 | — | — | — | 2 | — | — | — |
| C5 | Tungsten Manganese Ruthenium | 90 | 10 | — | — | 1 | — | — | — |
| C6 | Tungsten Manganese Germanium | 90 | 10 | — | — | — | 0.5 | — | — |
| C7 | Tungsten Manganese Vanadium | 90 | 10 | — | — | — | — | 5 | — |
| C8 | Tungsten Manganese Tellurium | 90 | 10 | — | — | — | — | — | 2 |

TABLE 7

| | | TCR1 | TCR2 | TCR3 | TCR4 | TCR5 | Average TCR | Average deviation rate |
|---|---|---|---|---|---|---|---|---|
| C1 | Tungsten Manganese | 3742 | 3528 | 3854 | 3928 | 3468 | 3704 | 4.45% |
| C2 | Tungsten Manganese Iron | 3516 | 3324 | 3418 | 3589 | 3615 | 3492 | 2.78% |
| C3 | Tungsten Manganese Molybdenum | 2995 | 3258 | 3196 | 3298 | 3028 | 3155 | 3.64% |
| C4 | Tungsten Ruthenium | 3395 | 3216 | 3329 | 3428 | 3365 | 3347 | 1.77% |
| C5 | Tungsten Manganese Ruthenium | 3275 | 3329 | 3314 | 3228 | 3295 | 3288 | 0.89% |
| C6 | Tungsten Manganese Germanium | 3108 | 3182 | 3189 | 3203 | 3199 | 3176 | 0.70% |
| C7 | Tungsten Manganese Vanadium | 2988 | 3077 | 2923 | 3081 | 3029 | 3020 | 1.70% |
| C8 | Tungsten Manganese Tellurium | 3419 | 3499 | 3386 | 3420 | 3398 | 3424 | 0.87% |

As illustrated in the aforesaid Examples, the electronic paste compositions (C5-C8) of the present disclosure can prepare heat generation elements with excellent performance. The average deviation of the TCR between the plurality of batches is significantly lower than the average deviation of the TCR of the heat generation elements prepared from other electronic paste compositions (C1-C4), which thereby shows the excellent performance in having a consistent and low TCR.

The preferred embodiments of the present disclosure are described in detail above, but the present disclosure is not limited to the specific details in the aforesaid embodiments. Various simple modifications can be made to the technical solution of the present disclosure within the scope of the technical concept of the present disclosure, and these simple modifications all fall within the protection scope of the present disclosure.

In addition, it should be understood that the various specific technical features described in the aforesaid specific embodiments can be combined in any suitable manner without contradiction. In order to avoid unnecessary repetition, the various possible combinations are not described separately in the present disclosure.

Furthermore, different embodiments of the present disclosure can also be combined arbitrarily, as long as they do not violate the concept of the present disclosure, and they should also be regarded as the content disclosed by the present disclosure.

The invention claimed is:

1. An electronic paste composition, comprising:
   tungsten,
   manganese,
   an additive, and
   an organic vehicle,
   wherein the additive is selected from the group consisting of ruthenium, tellurium, germanium, vanadium, and combinations thereof;
   wherein a weight ratio of the tungsten and the manganese is 7:3 to 9.5:0.5;
   wherein a content of the additive is 0.5-5 wt % based on a total weight of the tungsten and the manganese;
   wherein the organic vehicle is a mixture of terpineol, ethyl cellulose, and absolute ethanol, and wherein a content of the organic vehicle is 5-20 wt % based on the total weight of the tungsten and manganese; and
   wherein the electronic paste composition has a particle size of 200-500 meshes and a viscosity of 10-80 Pa·s.

2. A method for preparing the electronic paste composition according to claim 1, the method comprising:

mixing tungsten powder and manganese powder with an additive; and bringing a mixture as acquired into contact with an organic vehicle.

3. The method according to claim 2, wherein the contact is performed in a ball mill.

4. The method according to claim 3, wherein the ball mill is run at a speed of 100-800 r/min for 0.5-5 h.

5. The method according to claim 3, wherein the ball mill uses absolute ethanol as a ball milling medium, and a weight ratio of the mixture to the ball milling medium is 1:1 to 1:3.

6. The method according to claim 2, wherein the electronic paste composition as acquired has a particle size of 200-500 meshes and a viscosity of 10-80 Pa·s.

7. The method according to claim 3, wherein the electronic paste composition as acquired has a particle size of 200-500 meshes and a viscosity of 10-80 Pa·s.

8. The method according to claim 4, wherein the electronic paste composition as acquired has a particle size of 200-500 meshes and a viscosity of 10-80 Pa·s.

9. The method according to claim 5, wherein the electronic paste composition as acquired has a particle size of 200-500 meshes and a viscosity of 10-80 Pa·s.

10. The method of using the electronic paste composition according to claim 1 for preparing a ceramic heat generation body having a low temperature coefficient of resistance.

* * * * *